(12) United States Patent
Kanega et al.

(10) Patent No.: US 7,538,171 B2
(45) Date of Patent: May 26, 2009

(54) FLUORINE-CONTAINING COPOLYMER

(75) Inventors: Jun Kanega, Kitaibaraki (JP); Ji-Shan Jin, Kitaibaraki (JP); Katsumi Suzuki, Kitaibaraki (JP); Takashi Enokida, Kitaibaraki (JP); Keisuke Kokin, Kitaibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 0 days.

(21) Appl. No.: 11/791,307

(22) PCT Filed: Nov. 18, 2005

(86) PCT No.: PCT/JP2005/021271

§ 371 (c)(1),
(2), (4) Date: May 21, 2007

(87) PCT Pub. No.: WO2006/057203

PCT Pub. Date: Jun. 1, 2006

(65) Prior Publication Data

US 2008/0108769 A1 May 8, 2008

(30) Foreign Application Priority Data

Nov. 25, 2004 (JP) ............... 2004-339859

(51) Int. Cl.
- C08F 16/24 (2006.01)
- C08F 116/12 (2006.01)
- C08F 216/12 (2006.01)

(52) U.S. Cl. ............ 526/247; 526/332; 526/333; 570/123; 570/124; 570/125; 570/126; 570/134; 570/135; 570/136

(58) Field of Classification Search ............ 526/247
See application file for complete search history.

(56) References Cited

U.S. PATENT DOCUMENTS

| | | | |
|---|---|---|---|
| 4,138,426 A | 2/1979 | England | |
| 4,486,319 A * | 12/1984 | Jamison | 508/118 |
| 5,093,446 A * | 3/1992 | Hung | 526/247 |
| 5,670,593 A * | 9/1997 | Araki et al. | 526/245 |
| 6,215,536 B1 * | 4/2001 | Ebihara et al. | 349/86 |
| 6,221,516 B1 * | 4/2001 | Kohda et al. | 428/690 |
| 2004/0019176 A1 | 1/2004 | Araki et al. | |
| 2005/0131145 A1 | 6/2005 | Morita et al. | |

FOREIGN PATENT DOCUMENTS

| | | |
|---|---|---|
| EP | 0 842 959 | 5/1998 |
| JP | 03-091513 | 4/1991 |
| JP | 09-071674 | 3/1997 |
| JP | 10259216 A * | 9/1998 |
| JP | 10-329281 | 12/1998 |
| JP | 2003-176394 | 6/2003 |
| JP | 2003-342328 | 12/2003 |
| WO | WO 93/22379 | 11/1993 |

OTHER PUBLICATIONS

Funaki et al., machine translation of JP10259216A, 1998.*
STN search conducted by STIC, May 2008, 2 pages.*

* cited by examiner

*Primary Examiner*—Mark Eashoo
*Assistant Examiner*—Nicole M Buie
(74) *Attorney, Agent, or Firm*—Butzel Long

(57) ABSTRACT

A fluorine-containing copolymer, which comprises a hydroxyl-terminated fluorine-containing vinyl ether, represented by the following general formula:

$$CF_2=CFOR_fCH_2OH$$

(where Rf is a fluoroalkylene group, a fluoroalkyl ether group, or a fluoroalkoxyfluoroalkyl ether group, having 1-25 carbon atoms), and at least one of other fluorine-containing unsaturated monomers, where a high-molecular weight fluorine-containing copolymer having a melt viscosity (230° C.) of 0.1-100 g/10 min. is insoluble in a solvent, and can be used suitably for melt molding, whereas a low-molecular weight fluorine-containing copolymer having a glass transition temperature Tg of 20° C., or higher, and a number average molecular weight Mn of 1,000, or more is soluble in a solvent, and can be used suitably for coating agents, etc. The fluorine-containing copolymer has a high light transmissivity, and a low refractive index, and also has, as such, a good adhesiveness to various substrated without any surface treatment, any adhesives, or the like.

10 Claims, No Drawings

FLUORINE-CONTAINING COPOLYMER

RELATED APPLICATION

This application is a 35 U.S.C. §371 national stage filing of International Patent Application No. PCT/JP2005/021271, filed Nov. 18, 2003, to which priority is claimed under 35 U.S.C. §120 and through which and to which priority is claimed to Japanese Priority Patent Application No. 2004-339859, filed Nov. 25, 2004.

1. Technical Field

The present invention relates to a fluorine-containing copolymer, and more particularly to a fluorine-containing copolymer with distinguished adhesiveness to various substrates, and light transmissivity, and a low refractive index.

2. Background Art

Fluorine-containing copolymers can be obtained by copolymerization reaction of such fluorine-containing monomers as vinylidene fluoride, tetrafluoroethylene, hexafluoropropene, chlorotrifluoroethylene, perfluoro(lower-alkyl vinyl ether), etc. and have various characteristics in a wide range from the elastomer area to the resin area, particularly a high-temperature heat stability, and extremely low-temperature toughness and flexibility due to the nature of fluorine-containing substances, and furthermore they are distinguished in chemical resistance, and chemically very stable, and have also very distinguished characteristics such as non-tackiness, friction characteristics, and electrical characteristics.

Owing to these characteristics, the fluorine-containing copolymers can be effectively used in various fields such as those of semiconductors, architecture, electric·electronic parts, food, etc., but owing to their high cost, attempts to laminate and composite the fluorine-containing copolymers with other polymers, etc. have been extensively made to demonstrate their characteristics by using a small amount of the fluorine-containing copolymer. However, the fluorine-containing resins have a low surface energy, so such problems have been encountered as difficult bonding to substrates of other polymers, metal, glass, etc.

Various methods for bonding the fluorine-containing copolymer to the substrate have been so far proposed, for example, (a) method of subjecting the surface of a substrate to a physical roughening treatment such as a sand blast treatment, etc. to utilize an anchoring effect between the fluorine-containing copolymer and the substrate, (b) a method of subjecting the fluorine-containing resin to a surface treatment such as sodium etching, plasma treatment, photochemical treatment, etc. to chemically or physicochemically activating the surface, (c) a method of using an adhesive, etc.

However, the afore-mentioned methods (a) and (b) have problems such as necessity for some bonding pretreatment steps, resulting in not only complication of the steps and deterioration of productivity, but also limited species or shapes of substrates, and easy occurrence of coloring or damages on the appearance of the resulting laminates.

As to the afore-mentioned method (c), so many adhesives have been so far investigated, among which the hydrocarbon-based adhesives itself as such have no satisfactory heat resistance, so that, when applied to fluorine-containing copolymers requiring melt molding or melt processing at elevated temperatures, the adhesives may undergo heat decomposition to cause peeling, coloring, etc. and such problems as have been encountered the adhesiveness cannot be maintained any longer due to environmental changes, because of their unsatisfactory oil resistance, chemical resistance, and weather resistance.

Besides the afore-mentioned methods, a method of using a fluorine-containing copolymer provided with polar functional groups at the terminals of the main chain, etc. have been so for proposed, where the copolymer is used as a primer, or as an adhesive upon blending with a substrate to be bonded, and the fluorine-containing copolymer itself as such is not directly bonded to the target substrate.

Patent Literature 1: JP-A-2003-176394

Furthermore, a method of using a fluorine-containing elastomer having polar functional groups at the terminals of side chains of the fluorine-containing copolymer has been also so far proposed, where monomers to be used to introduce the polar functional groups to the terminals of the side chains are monomers containing special, expensive perfluoro-based polar functional groups, and thus the resulting fluorine-containing copolymer will be inevitably expensive.

Patent Literature 2: U.S. Pat. No. 4,138,426

A copolymer of $TFE/CF_2=CFO(CF_2)_3COOOCH$ (molar ratio=95.7/4.3) has been also disclosed as a precursor of an ion-exchangeable group-containing, fluorine-containing copolymer. However, the fluorine-containing copolymer is insoluble in an organic solvent.

Patent Literature 3: JP-No. 3,450,597

DISCLOSURE OF THE INVENTION

Problem to be Solved by the Invention

An object of the present invention is to provide a fluorine-containing copolymer with a high light transmissivity and a low refractive index, and as such having a good adhesiveness to various substrates without any necessity for surface treatment and the use of an adhesive.

Means for Solving the Problem

The object of the present invention can be attained by a fluorine-containing copolymer, which comprises 0.1-68% by weight of a hydroxyl-terminated, fluorine-containing vinyl ether represented by the following general formula:

$$CF_2=CFOR_fCH_2OH$$

(where Rf is a fluoroalkylene group, a fluoroalkyl ether group or a fluoroalkoxyfluoroalkyl ether group, having 1 to 25 carbon atoms), and 99.9-32% by weight of at least one of other fluorine-containing unsaturated monomers.

In the fluorine-containing copolymers containing a hydroxyl-terminated fluorine-containing vinyl ether, the copolymers having not more than 30% by weight, preferably 0.1-20% by weight, of the fluorine-containing vinyl ether, as copolymerized therein, are high-molecular weight polymers capable of undergoing melt molding, but insoluble in an organic solvent, whereas the copolymers containing 30-68% by weight, preferably 35-67% by weight, of the fluorine-containing vinyl ether, as copolymerized therein, are low-molecular weight polymers soluble in an organic solvent, and thus suitable for the coating use, and not suitable for melt molding use.

EFFECT OF THE INVENTION

In the present fluorine-containing copolymers, the high-molecular weight copolymers containing not more than 30% by weight, preferably 0.1-20% by weight, of a hydroxyl-terminated, fluorine-containing vinyl ether, as copolymerized therein, and having a melt viscosity (230° C.) of 0.1-100 g/10 min. can undergo melt processing at relatively low processing temperatures such as about 180° to about 280° C., and have a high light transmissivity at a wavelength of 250-650 nm of 70% or more, or a high light transmissivity at a wavelength of 400-800 nm of 90% or more, and a low refractive index at 589 nm of not more than 1.36, preferably not more than 1.35, and also as such have a good adhesiveness to various substrates without any necessity for the surface treatment or the use of an adhesive, and thus can be effectively used for forming a multi-layered structure (laminate) or a composite with various substrates.

The low-molecular weight copolymers containing 30-68% by weight, preferably 35-67% by weight, of a hydroxyl-terminated fluorine-containing vinyl ether, as copolymerized therein, and having, a glass transition temperature Tg of 20° C. or more, and a number average molecular weight Mn of 1,000 or more, preferably 1,000-300,000, have not only a distinguished adhesiveness, but are also soluble in an organic solvent, so they have a distinguished coatability, and thus have an easy film formability.

The hydroxyl-terminated fluorine-containing vinyl ether (A) $CF_2=CFORfCH_2OH$ to be used as a copolymer component in the present invention differs from the hydroxyl-terminated, fluorine-containing vinyl compound (B) $CH_2=CFCF_2RfCH_2OH$ disclosed in the following Patent Literature 4 on the following points, when they are formed into copolymers, respectively:

(1) The copolymer of compound (A) with $CF_2CFO$ as introduced into the main chain skeleton has an advantage in lowering refractive index. Furthermore, it seems that the combination of the main chain with the Rf group through an oxygen atom (O) can prevent structural instability due to the side chain, in spite of the fact that Rf group is a side chain of high steric hindrance, thereby attaining thermal stability.

(2) The copolymer of compound (B) with the $CH_2$ group as introduced into the main chain skeleton, is liable to cause dehydrofluorination reaction at the main chain skeleton, thereby deteriorating the thermal stability and chemical resistance. Increasing fluorine (F) content will make it difficult to attain desired optical characteristics (refractive index of 1.36 or less).

(3) It is structurally preferable from the viewpoint of optical characteristics that there are branches as side chains to control the crystallinity, and it is advantageous for the optical characteristics to select a hexafluoropropene oxide group as an Rf group. Furthermore, the presence of branches makes the amorphous copolymer and consequently soluble in a solvent.

Patent Literature 4: JP-A-10-329281

BEST MODES FOR CARRYING OUT THE INVENTION

Preferable hydroxyl-terminated, fluorine-containing vinyl ether for use in the present invention includes fluorine-containing vinyl ethers represented by the following general formula:

$$CF_2=CF[OCF_2CF(CF_3)]_bO(CF_2)_aO[CF(CF_3)CF_2O]_c CF(CF_3)CH_2OH$$

(where subscript a is an integer of 1-10, and subscripts b+c is an integer of 0-8). Such hydroxyl-terminated fluorine-containing vinyl ethers can be prepared by reduction reaction of the ester group of ester-terminated fluorine-containing vinyl ethers represented by the following general formula:

$$CF_2=CF[OCF_2CF(CF_3)]_bO(CF_2)_aO[CF(CF_3)CF_2O]_c CF(CF_3)COOR$$

(where R is an alkyl group, an aralkyl group, or an aryl group, subscript a is an integer of 1-10, and subscripts b+c is an integer of 0-8).

The hydroxyl-terminated, fluorine-containing vinyl ether, where the Rf group of the afore-mentioned general formula is a fluoro-alkylene group, a fluoroalkyl ether group, or a fluoroalkoxyfluoroalkyl group, having 1-25 carbon atoms, includes, for example, the following compounds.

$CF_2=CFOCF_2CH_2OH$
$CF_2=CFO(CF_2)_2CH_2OH$
$CF_2=CFO(CF_2)_3CH_2OH$
$CF_2=CFO(CF_2)_4CH_2OH$
$CF_2=CFOCF_2CF(CF_3)OCF_2CF_2CH_2OH$
$CF_2=CFOCF_2CF(CF_3)O(CF_2)_2CH_2OH$
$CF_2=CFOCF_2CF(CF_3)O(CF_2)_3CH_2OH$
$CF_2=CFOCF_2CF(CF_3)O(CF_2)_4CH_2OH$
$CF_2=CFOCF_2CF(CF_3)OCF_2CF(CF_3)OCF_2CH_2OH$
$CF_2=CFOCF_2CF(CF_3)OCF_2CF(CF_3)O(CF_2)_2CH_2OH$
$CF_2=CFOCF_2CF(CF_3)OCF_2CF(CF_3)O(CF_2)_3CH_2OH$
$CF_2=CFOCF_2CF(CF_3)OCF_2CF(CF_3)O(CF_2)_4CH_2OH$
$CF_2=CFOCF_2CF(CF_3)CF_2CF(CF_3)CF_2CH_2OH$
$CF_2=CFOCF_2CF(CF_3)CF_2CF(CF_3)(CF_2)_2CH_2OH$
$CF_2=CFOCF_2CF(CF_3)CF_2CF(CF_3)(CF_2)_3CH_2OH$
$CF_2=CFOCF_2CF(CF_3)CF_2CF(CF_3)(CF_2)_4CH_2OH$
$CF_2=CFOCF_2CF_2OCF(CF_3)CH_2OH$
$CF_2=CFOCF_2CF(CF_3)OCF_2CF_2OCF(CF_3)CH_2OH$

The hydroxyl-terminated, fluorine-containing vinyl ether can be copolymerized in a proportion of 0.1-68% by weight on the basis of the resulting copolymer. When this component is copolymerized in a proportion of more than 68% by weight, the heat resistance will be deteriorated, though the adhesiveness is ameliorated, whereas when not used in the copolymerization, particularly the adhesiveness will be deteriorated.

Other fluorine-containing unsaturated monomer to be copolymerized with the hydroxyl-terminated fluorine-containing vinyl ether includes compounds represented by the following general formula:

$$R_1R_2C=CR_3R_4$$

(where $R_1$, $R_2$, $R_3$ and $R_4$ are same or different groups, which are individually hydrogen atoms, chlorine atoms, fluorine atoms, fluoroalkyl groups, fluoroalkyl ether groups, or fluoroalkoxyfluoroalkyl ether groups, having 1-24 carbon atoms, at least one of which is a fluorine atom, or a fluorine-containing group), such as tetrafluoroethylene, hexafluoropropene, trifluorochloroethylene, vinylidene fluoride, vinyl fluoride, perfluoro(methyl vinyl ether), perfluoro(ethyl vinyl ether), perfluoro(propyl vinyl ether), 2,2,3,3,3-pentafluoropropyl vinyl ether, and following fluoroalkoxyfluoroalkyl ether-containing compounds:

$CF_2$=$CFO(CF_2)_3OCF_3$,
$CF_2$=$CFOCF(CF_3)CF_2OCF_3$,
$CF_2$=$CFOCF(CF_3)CF_2OC_3F_7$,
$CF_2$=$CFOCF(CF_3)CF_2OCF(CF_3)C_4F_9$, etc.

Among them, tetrafluoroethylene, vinylidene fluoride and prefluoro(lower-alkyl vinyl ether) are preferable.

To form a high-molecular weight copolymer, the fluorine-containing unsaturated monomer can be copolymerized in a proportion of 70% by weight or more, preferably 80-99.9% by weight, on the basis of the resulting copolymer. In the case of using the afore-mentioned preferable three kinds of fluorine-containing unsaturated monomer, tetrafluoroethylene can be used in a proportion of 10-85% by weight, preferably 20-80% by weight; perfluoro(lower-alkyl vinyl ether), where the lower-alkyl group is methyl, ethyl, or propyl, particularly perfluoro(ethyl vinyl ether) is used in a proportion of 3-50% by weight, preferably 5-40% by weight; and vinylidene fluoride can be used in a proportion of 7-85% by weight, preferably 10-74.9% by weight, on the basis of the resulting fluorine-containing copolymer.

Concerning these copolymers, if the copolymerization proportion of tetrafluoroethylene is less than 10% by weight, the chemical resistance, that is one of the characteristics of the fluorine-containing copolymer, will be limited, whereas in a copolymerization proportion of more than 85% by weight, both melting point and melt viscosity will be higher, and consequently the processability will be deteriorated. As to the perfluoro(ethyl vinyl ether), the transparency will be deteriorated in a copolymerization proportion of less than 3% by weight, whereas in a copolymerization proportion of more than 50% by weight, the production will be difficult to conduct. As to the vinylidene fluoride, both melting point and melt viscosity will be higher in a copolymerization proportion of less than 7% by weight, deteriorating the processability, and any soft molding products are no more obtainable, whereas in a copolymerization proportion of more than 85% by weight the chemical resistance will be limited.

In the case of copolymerizing 30-68% by weight, preferably 35-67% by weight, of a fluorine-containing vinyl ether with 70-32% by weight, preferably 65-33% by weight, of a fluorine-containing unsaturated monomer on the basis of the resulting copolymer to form a low-molecular weight fluorine-containing copolymer, it is preferable to use tetrafluoroethylene alone or together with a smaller amount of vinylidene fluoride than that of tetrafluoroethylene.

The fluorine-containing copolymer can be produced by any polymerization method such as a solution polymerization method, an emulsion polymerization method, a suspension polymerization method, etc. Among them, a solution polymerization method and a solution-suspension polymerization method capable of easily reducing the content of impurities originating from polymerization raw materials are preferable, whereas an emulsion polymerization method is preferable from the viewpoint of productivity.

In the case of the solution polymerization method and the solution-suspension polymerization method, the following polymerization reaction solvent can be preferably used: for example, chlorinated and/or fluorinated carbons such as chlorofluorocarbon, hydrochlorocarbon, hydrofluorocarbon, hydrochlorofluorocarbon, etc., and perfluoro compounds such as perfluoro(2-n-butyltetrahydrofuran), perfluorohexane, etc. Furthermore, alcohols or hydrocarbons can be also used.

In the case of the solution-suspension polymerization method, a mixture of water with a solvent immiscible or less miscible with water can be used as a polymerization reaction solvent. A mixing ratio of such an immiscible or less miscible solvent to water can be changed, as desired, depending on polymerization temperature, polymerization pressure, amounts of charged raw material monomers, etc., but it is preferable from the viewpoints of removing the heat of polymerization, or homogenization of copolymer composition that about 0.1 to about 10 parts by weight, preferably about 1 to about 5 parts by weight, of water must be present on the basis of one part by weight of such a solvent.

It is also preferable to use the water in the form of an aqueous alkaline solution containing NaOH, KOH, $NaHCO_3$, $NaKCO_3$, $Na_2CO_3$, $K_2CO_3$, $Na_2HPO_4.12H_2O$, $K_2HPO_4$, $(NH_4)_2HPO_4$, aqueous ammonia, etc., preferably an alkali metal chloride compound, as dissolved therein. The reaction system admixed with the aqueous alkaline solution will change to an acidic side in progress of polymerization reaction, depending on reaction conditions, composition ratio, etc., resulting in slow progress of polymerization reaction in some cases. In such cases, the aqueous alkaline solution can be added thereto again in the course of polymerization reaction. It is preferable to keep the polymerization reaction system in a range of pH 5-12 in this manner.

In the case of the emulsion polymerization method, a mixture of an emulsifying agent, a pH-adjusting agent, and water can be used as a polymerization reaction solvent.

A polymerization initiator can be selected in view of the desired polymerization method, and generally includes an organic peroxide, an azo compound, an inorganic peroxide, etc. Taking account of the heat resistance and chemical resistance of the resulting fluorine-containing copolymers, an organic peroxide is preferable. The organic peroxide for use herein includes diacyl peroxide, peroxycarbonate, peroxyester, etc., and preferably radical initiators such as isobutyryl peroxide, lauroyl peroxide, stearoyl peroxide, succinic acid peroxide, di-n-propyl peroxydicarbonate, diisopropyl peroxycarbonate, bis(4-t-butylcyclohexyl) peroxydicarbonate, etc., and fluorine-containing radical initiators such as bis(heptafluorobutyryl) peroxide, pentafluorobutyroyl peroxide, etc. In the case of conducting the solution-suspension polymerization, or the emulsion polymerization in an aqueous medium, it is preferable to use a water-soluble persulfate salt such as ammonium persulfate, sodium persulfate, potassium persulfate, etc.

The amount of the polymerization initiator to be used depends on a polymerization solvent to be used in the reaction, polymerization conditions, polymerization temperature, etc. and cannot be generally set forth. Usually, the polymerization initiator can be added at the time of charging the monomers in an amount corresponding to about 0.01 to about 20% by mole, preferably about 0.1 to about 10% by mole, on the basis of total moles of the monomers to be used in the polymerization reaction. Sometimes, polymerization reaction may be difficult to proceed, depending on the reaction conditions or composition ratio. In such a case, the polymerization initiator can be added thereto again in the course of polymerization reaction.

A chain-transfer agent, such as methanol, ethanol, 2-propanol, n-hexane, cyclohexane, carbon tetrachloride, chloroform, dichloromethane, methane, ethyl acetate, acetone, etc. can be added thereto, if required, to adjust the molecular weight. Adjustment of the molecular weight by the chain-transfer agent is effective for producing an organic solvent-soluble, low-molecular weight fluorine-containing copolymer by copolymerization of much more fluorine-containing vinyl ether.

Polymerization temperature is not particularly limited, the reaction can be carried out in a range of about 0° to about 100° C., preferably about 5° to about 60° C., and under polymerization pressure ranging from about 0.1 to about 10 MPa·G, preferably from about 0.2 to about 5 MPa·G. After the reaction, the reaction solvent is distilled off from the reaction mixture under vacuum, and, if required, washed with deionized water, dried, etc., whereby the desired fluorine-containing copolymer can be obtained.

The resulting fluorine-containing copolymer is a high-molecular weight copolymer, and, when applied to the melt molding, it is desirable that the melting point is not higher than 230° C., preferably 100°-210° C., and the melt flow rate, MFR (230° C.) showing a melt viscosity is 0.1-100 g/10 min., preferably 1-80 g/10 min. At a higher melting than 230° C., the molding temperature must be set to a higher temperature, and consequently in the lamination or making composite with various substrates, excess heat will be given to the substrates, resulting in decomposition or foaming, depending on substrate species. At a lower melt flow rate than 0.1 g/10 min., the molding temperature must be likewise set to a higher temperature, whereas at a higher melt flow rate than 100 g/10 min., not only molding will be difficult to conduct, but also the characteristics of a high-molecular weight copolymer as to the strength, elongation, etc. will not be exhibited any more. Such a fluorine-containing copolymer is insoluble in a solvent.

The high-molecular weight copolymer thus prepared can be processed into various molding products such as films, sheets, tubes, hoses, rods, blocks, belts, bottles, tanks, etc. by a molding method such as compression molding, extrusion molding, calender molding, blow molding, injection molding, casting molding, etc., depending on the melt viscosities at the molding temperatures as used and further by a secondary processing process such as cutting, welding, melting, etc.

Furthermore, multilayered structures or composites in various shapes such as multilayered films, multilayered sheets, multilayered tubes, multilayered hoses, multilayered blocks, multilayered bottles, etc. can be formed by coextrusion with various polymers such as polyacrylic acid-based resin, polyamide-based resin, polycarbonate-based resin, polyester-based resin, polyurethane-based resin, etc.

The molding can be carried out by the ordinary thermoplastic resin molding machine, such as an extrusion molding machine, a compression molding machine, an injection molding machine, a blow molding machine, etc., and the forming of the multilayered structures can be carried out by such a molding process as a multilayer coextrusion molding process, a multilayer blow molding process, a multilayer injection molding process, etc., and particularly formation of multilayered tubes or multilayered rods can be carried out preferably by a multilayer coextrusion molding process.

Though the molding conditions depend on the melt viscosities of the fluorine-containing copolymer, or the thermoplastic resin used in the formation of multilayered structures or composites together with the fluorine-containing copolymer, it is preferable in the extrusion molding, or blow molding to set the cylinder temperature to such a temperature as to make a melt viscosity have a value of 1-50 g/10 min. For example, molding temperatures of about 180°-280° C. are a preferable range. Fluorine-containing copolymers such as copolymers of fluorine-containing unsaturated monomers with unsaturated carboxylic acids, their salts or alkyl esters can be also used as a thermoplastic resin.

By melt pressing a film of the fluorine-containing copolymer onto a polyamide resin as a heat-resistant resin, or metal, glass, etc. as an inorganic substrate, a multilayered structure can be formed. Melt pressing temperature must be above the melting point of the fluorine-containing copolymer to be used, and is preferably about 120°-260° C.

The low-molecular weight, fluorine-containing copolymer containing 30-68% by weight, preferably 35-67% by weight, of hydroxyl-terminated, fluorine-containing vinyl ether, as copolymerized therein, which has a glass transition temperature Tg of 20° C. or higher, preferably 21°-50° C., and a number average molecular weight Mn of 1,000 or more, preferably 1,000-300,000, is soluble in an organic solvent, and can be used suitably for coating application, etc. When the copolymerization ratio of the hydroxyl-terminated, fluorine-containing vinyl ether is less than 30% by weight, the desired solubility in an organic solvent cannot be obtained, whereas in the copolymerization ratio of more than 68% by weight, the copolymer will be difficult to obtain.

Solutions of the low-molecular weight, fluorine-containing copolymer in at least one of various organic solvents to be used as a polymerization reaction solvent, for example, monohydric or polyhydric alcohols such as methanol, ethanol, propanol, isopropanol, n-butanol, ethylene glycol, ethylene glycol monopropyl ether, etc.; ketones such as methyl ethyl ketone, methyl isobutyl ketone, cyclohexanone, etc.; acetic acid esters such as ethyl acetate, butyl acetate, isobutyl acetate, etc.; aromatic hydrocarbons such as benzene, toluene, xylene, etc.; aprotic polar solvents such as dimethyl formamide, dimethyl acetamide, N-methyl-2-pyrrolidone, etc.; halides such as perfluorobenzene, perfluoro(2-butyltetra-hydrofuran), trichlorotrifluoroethane, etc.; or the like can be cast onto substrates such as various resin molding products, synthetic fiber products, semisynthetic fiber products, metallic products, glass products, etc., followed by drying off the solvent, whereby multilayered structures or composites can be formed. Drying temperature depends on the species of the solvent used, but generally is in a range of about 30° to about 260° C.

The solution of the low-molecular weight, fluorine-containing copolymer in an organic solvent also has a good coatability, and thus can be readily formed into films. Coating can be carried out with a solution having a concentration of about 1 to about 20% by weight, preferably about 2 to about 10% by weight, by the ordinary process such as a roll coater process, a casting process, a dipping process, a spin coating process, etc., whereby thin films having a thickness of a few μm or less, which is difficult to attain by melt molding, can be formed. Suitable substrates for coating are not particularly limited, and include, for examples, plastic films or sheets of polyethylene terephthalate, polycarbonate, poly(methyl methacrylate), triacetyl cellulose, polyolefin, polyamide, poly(vinyl chloride), etc. By forming a thin coating film on such a substrate a multilayered structure or composite can be obtained.

EXAMPLES

The present invention will be described in detail below, referring to Examples, but it should not be construed that the present invention is limited only to these Examples.

Example 1

An SUS316 autoclave having a net capacity of 3 L provided with a stirrer was degassified to vacuum, and charged with the following compound:

| Perfluoro(2-n-butyltetrahydrofuran) | 2,300 g | and then the autoclave was degassified and flushed with a nitrogen gas, and charged with the following compounds:

| Tetrafluoroethylene [TFE] | 330 g (49.4 mol. %) |
| Perfluoro(ethyl vinyl ether) [FEVE] | 520 g (36.0 mol. %) |
| Vinylidene fluoride [VdF] | 60 g (14.0 mol. %) |
| $CF_2=CFO(CF_2)_3CH_2OH$ [FHBVE] | 10 g (0.5 mol. %), | and heated to 35° C., whereby the inside pressure of the autoclave was elevated to 0.92 MPa·G. Then, a solution of isobutyryl peroxide as an initiator in a solvent mixture of $CF_3CF_2CHCl/CClF_2CF_2CHClF$ was fed thereto by a metering pump to initiate the polymerization. The polymerization reaction was continued until the inside pressure reached to 0.62 MPa·G.

Then, the inside of the autoclave was subjected to pressure reduction with stirring by a vacuum pump through a trap for cooling and collecting the solvents and unreacted monomers, thereby completely removing the solvents and unreacted monomers from the autoclave. Polymerizates taken out of the autoclave were washed with deionized water, and then recovered by a centrifugal filter and dried under vacuum, whereby 280 g of white, powdery fluorine-containing copolymer was obtained. The composition of the resulting fluorine-containing copolymer was found to be TFE/FEVE/VdF/FH-BVE=70/18/11/1% by weight.

Besides the composition ratio of the copolymer, hardness, melting point, melt viscosity, light transmissivity, refractive index, melt moldability, adhesiveness, etc. of the resulting fluorine-containing copolymer were determined:

Copolymer composition ratio: Determined by $^{19}$F-NMR and infrared absorption spectra Hardness: D hardness at 25° C. was measured according to JIS K7215, to compare a softness of fluorine-containing copolymer Melting point: Apex temperature Tm of heat absorption peak as a melting point was measured with an instrument Model DSC220C, made by Seiko Instrument Co. according to a temperature program of heating a test piece from 30° C. to 300° C. at a temperature elevation rate of 10° C./min., followed by cooling down to 30° C. at a cooling rate of 10° C./min., and by repeating to 300° C. at a temperature elevation rate of 10° C./min Melt viscosity: Weight of an extrudate obtained by placing the resulting copolymer into a cylinder, 9.5 mm in inner diameter, followed by keeping at 230° C. for 5 minutes, and extruding it through an orifice, 2.095 mm in inner diameter and 8.00 mm long, under a piston load of 5 kg was measured with Melt Indexer, made by Toyo Seiki Works, Ltd.

Light transmissivity: A film, 100 μm in thickness, was measured at wavelengths of 300 nm, 450 nm and 650 nm, with an ultraviolet-visible ray spectrophotometer, made by Nihon Spectrophotometer Co.

Refractive index: A film, 100 μm in thickness, was measured at 25° C. and the wavelength of 589 nm with an Abbe's refractometer Melt moldability: Tubes, 2 mm in diameter, rods, 1 mm in diameter, and films, 0.5 mm in thickness, were molded under the following conditions through an extruder, TP-30, made by Thermoplastic Kogyo Co., those with a good molding, as confirmed, were assessed as being satisfactory "◯"., whereas those suffered from such inconveniences as melt fracture, unstable dimensions, etc., or in molding failure, as confirmed, were assessed as being unsatisfactory "X"

| Molding outlet side set temp. | Melting heater inside set temp. | | | Fluorine-containing copolymer feed side set temp. |
|---|---|---|---|---|
| D | C4 | C3 | C2 | C1 |
| 230° C. | 220° C. | 200° C. | 170° C. | 150° C. |

Adhesiveness: The fluorine-containing copolymer was melt pressed onto individual substrates of poly(methyl methacrylate) [PMMA], nylon-12, polyurethane elastomer [thermoplastic PU] (Iron Rubber U801, a Unimatec product), and TFE/FEVE/VdF/methacrylic acid (70/18/11/1wt. %) copolymer (fluorine-containing quaternary copolymer), and the resulting melt-pressed copolymer films on the substrates were cross-cut each into 100 squares, 1 mm×1 mm each.

The adhesiveness was evaluated according to a cross-cut test or a cross-cut and tape test to give marks on the following evaluation basis, where 0-2 marks slow an unsatisfactory level "X", 3-7 marks a fairly level "Δ", and 8-10 marks a satisfactory level satisfactory "◯".

Evaluation mark basis (black spots show defected parts)

11 12
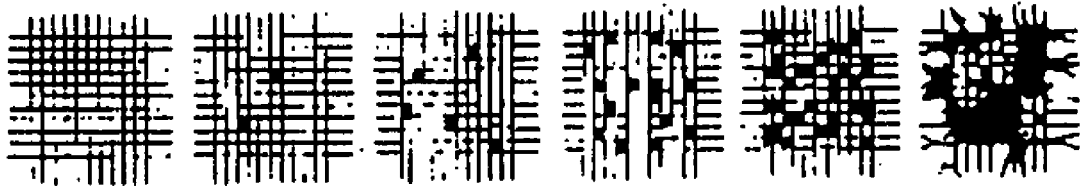
10 marks   8 marks   6 marks   4 marks   2 marks   0 mark

Example 2

Polymerization was carried out in the same manner as in Example 1, except that the amount of the following component in the components to be charged after the degassing and flushing with a nitrogen gas was changed to 60 g and the polymerization temperature was changed to 45° C.:

$CF_2=CFO(CF_2)_3CH_2OH$ [FHBVE]

The resulting white, powdery fluorine-containing copolymer (290 g) had a composition of TFE/FEVE/VdF/FHBVE=70/14/11/5 wt. %.

Example 3

Polymerization was carried out in the same manner as in Example 1, except that the amounts of the components to be charged after the degassing and flushing with a nitrogen gas were changed as follows:

| | |
|---|---|
| Tetrafluoroethylene [TFE] | 225 g (34.1 mol. %) |
| Perfluoro(ethyl vinyl ether) [FEVE] | 645 g (65.3 mol. %) |
| Vinylidene fluoride [VdF] | 78 g (18.5 mol. %) |
| $CF_2=CFO(CF_2)_3CH_2OH$ [FHBVE] | 40 g (2.2 mol. %) |

The resulting white, powdery fluorine-containing copolymer (270 g) had a composition of TFE/FEVE/VdF/FHBVE=53/27/16/4 wt. %.

Example 4

Polymerization was carried out in the same manner as in Example 1, except that the amounts of the components to be charged after the degassing and flushing with a nitrogen gas were changed as follows:

| | |
|---|---|
| Tetrafluoroethylene [TFE] | 50 g (6.6 mol. %) |
| Perfluoro(ethyl vinyl ether) [FEVE] | 645 g (39.6 mol. %) |
| Vinylidene fluoride [VdF] | 250 g (51.8 mol. %) |
| $CF_2=CFO(CF_2)_3CH_2OH$ [FHBVE] | 40 g (1.9 mol. %) |

The resulting white, powdery fluorine-containing copolymer (270 g) had a composition of TFE/FEVE/VdF/FHBVE=30/24/45/1wt. %.

Example 5

Polymerization was carried out in the same manner as in Example 1, except the FHBVE component in the components to be charged after the degassing and flushing with a nitrogen gas was changed as follows:

$CF_2=CFO(CF_2)_2OCF(CF_3)CH_2OH$ [FHVEPA] 75 g

The resulting white, powdery fluorine-containing copolymer (270 g) had a composition of TFE/FEVE/VdF/FHVEPA=70/18/11/1wt. %. FHVEPA was synthesized in the manner as disclosed in the following Reference Example

Reference Example

Into a glass reactor vessel having a capacity of 5 L, provided with a distilling apparatus with a cooling pipe, a stirrer with large blades, a dropping funnel, and a thermometer were charged 1,656 g (12.0 moles) of pre-calcined potassium carbonate and 1,500 g of a fluoro oil (Varierta J100, a NOK-Kluber product), followed by flushing the vessel inside with a nitrogen gas. Then, 1,357 g (3.03 moles) of dimethyl-2,2'-(perfluoroethylene) dioxydi(2,3,3,3-tetrafluoropropionate) (99.5 gGC %), represented by the following chemical formula, was slowly added thereto at room temperature, followed by rapid heating of the reactor vessel to an inside temperature of 180° or higher:

$CH_3OOCCF(CF_3)O(CF_2)_2OCF(CF_3)COOCH_3$

In progress of vinylation reaction, refluxing started, and when the reflux condenser part temperature of the distillation apparatus exceeded 130° C., the distillate was recovered. By continuing to heat until no more refluxing took place in the reactor vessel, 1,090 g (yield: 59%) of methyl perfluoro-2-(2-vinyloxyethoxy)propanate (GC purity: 61.2%), represented by the following chemical formula, was obtained:

$CF_2=CFO(CF_2)_2OCF(CF_3)COOCH_3$ 1,060 g of the crude methyl perfluoro-2-(2-vinyloxy-ethoxy)-ropanate (GC purity: 61.2%) was purified by distillation in a distillation apparatus provided with a Dixon packings (3 mm in diameter)-filled distillation column (300 mm long and 25 mm in diameter), a thermometer, a nitrogen gas feeding capillary, and a vacuum pump, whereby 418.9 g (distillation yield: 62.61%) of a purified product (GC purity: 97.0%) having a boiling point of 93.6°-93.8° C./21 kPa was obtained. The chemical structure of the purified product was found to be the same as that of well known methyl perfluoro-2-(2-vinyloxyethoxy)propanate by $^1$H-NMR and $^{19}$F-NMR.

280 g (0.73 moles) of the purified methyl perfluoro-2-(2-vinyl-oxyethoxy)propanate, and 500 ml of anhydrous ethanol were charged into a reactor vessel provided with a reflux cooler, stirring blades, and a thermometer, and then the reactor vessel was cooled in an ice bath. 24.9 g (0.73 moles) of $NaBH_4$ was added thereto portion-by-portion in several times carefully about heat generation, while keeping the reactor vessel inside temperature not to exceed 10° C. as an upper limit temperature. Then, the reactor vessel is allowed to undergo slow temperature elevation to room temperature, and stirred at room temperature for at least 8 hours.

Then, the reactor vessel was again cooled in the ice bath, and 200 g of 10% hydrochloric acid was slowly dropwise added thereto carefully about heat generation and foaming. Then, 1,700 ml of water was further added thereto, and the lower layer of the resulting separated two layers was recovered by a separating funnel, and the thus obtained organic layer was washed with an aqueous saturated sodium chloride solution, whereby 267.8 g (yield: 68%) of 1H, 1H-perfluoro-2-(2-vinyloxyethoxy)propanol (GC purity: 64.0%), represented by the following chemical formula, was obtained:

$CF_2=CFO(CF_2)_2OCF(CF_3)CH_2OH$ 256 g of the crude 1H, 1H-perfluoro-2-(2-vinyloxyethoxy) propanol was purified by distillation in the afore-mentioned distillation apparatus, whereby 158.2 g (distillation yield: 96%) of purified product (GC purity: 96.5%) having a boiling point of 95.6-95.8° C./18.2 kPa was obtained.

Example 6

Polymerization was carried out in the same manner as in Example 4, except that the FHBVE component in the components to be charged after the degassing and flushing with a nitrogen gas was changed as follows:

$CF_2=CFO(CF_2)_2OCF(CF_3)CH_2OH$ [FHVEPA] 75 g

The resulting white, powdery fluorine-containing copolymer (280 g) had a composition of TFE/FEVE/VdF/FHVEPA=30/23/46/1wt. %.

Example 7

Polymerization was carried out in the same manner as in Example 3, except that the FHBVE component in the components to be charged after the degassing and flushing with a nitrogen gas was changed as follows:

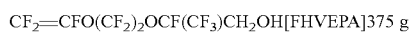

$CF_2=CFO(CF_2)_2OCF(CF_3)CH_2OH[FHVEPA]$ 375 g

The resulting white, powdery fluorine-containing copolymer had a composition of TFE/FEVE/VdF/FHVEPA=53/28/16/3 wt. %.

Comparative Example 1

Polymerization was carried out in the same manner as in Example 1, except that the $CF_2=CFO(CF_2)_3CH_2OH$ [FHBVE] component was excluded from the components to be charged after the degassing and flushing with a nitrogen gas. The resulting white, powdery fluorine-containing copolymer (270 g) had a composition of TFE/FEVE/VdF=70/19/11wt. %

Comparative Example 2

Polymerization was carried out in the same manner as in Example 1, except that the components to be charged after the degassing and flushing with a nitrogen gas were changed as follows:

| | |
|---|---|
| Tetrafluoroethylene [TFE] | 225 g (34.9 mol. %) |
| Perfluoro(ethyl vinyl ether) [FEVE] | 645 g (46.3 mol. %) |
| Vinylidene fluoride [VdF] | 78 g (18.9 mol. %) |

The resulting white, powdery copolymer (280 g) had a composition of TFE/FEVE/VdF=55/29/17 wt. %.

Results of measurements and evaluation are shown in the following Table 1.

TABLE 1

| Items of measurements · evaluation | Example No. | | | | | | | Comp. Ex. No. | |
|---|---|---|---|---|---|---|---|---|---|
| | 1 | 2 | 3 | 4 | 5 | 6 | 7 | 1 | 2 |
| Copolymer composition | | | | | | | | | |
| TFE (wt. %) | 70 | 70 | 53 | 30 | 70 | 30 | 53 | 70 | 55 |
| FEVE (wt. %) | 18 | 14 | 27 | 24 | 18 | 23 | 28 | 19 | 29 |
| VdF (wt. %) | 11 | 11 | 16 | 45 | 11 | 46 | 16 | 11 | 17 |
| FHBVE (wt. %) | 1 | 5 | 4 | 1 | — | — | — | — | — |
| FHPEVE (wt. %) | — | — | — | — | 1 | 1 | 3 | — | — |
| Hardness | | | | | | | | | |
| Shore D (25° C.) | 57 | 56 | 40 | 35 | 55 | 33 | 39 | 47 | 38 |
| Melting point | | | | | | | | | |
| Tm (° C.) | 174 | 162 | 120 | 110 | 170 | 108 | 118 | 179 | 115 |
| Melt viscosity | | | | | | | | | |
| MFR (230° C.) (g/10 min.) | 3 | 20 | 50 | 40 | 5 | 37 | 30 | 14 | 35 |
| Light transmissivity | | | | | | | | | |
| 250 nm (%) | 85 | 82 | 76 | 77 | 85 | 78 | 81 | 81 | 75 |
| 450 nm (%) | 93 | 91 | 83 | 84 | 92 | 85 | 91 | 91 | 83 |
| 650 nm (%) | 94 | 92 | 85 | 90 | 95 | 91 | 92 | 92 | 84 |
| Refractive index | | | | | | | | | |
| 25° C., 589 nm | 1.35 | 1.35 | 1.35 | 1.37 | 1.35 | 1.36 | 1.35 | 1.35 | 1.35 |
| Melt moldability | | | | | | | | | |
| 2 mm-dia. tube | ○ | ○ | ○ | ○ | ○ | ○ | ○ | ○ | ○ |
| 1 mm-dia. rod | ○ | ○ | ○ | ○ | ○ | ○ | ○ | ○ | ○ |
| 0.5 mm-thick film | ○ | ○ | ○ | ○ | ○ | ○ | ○ | ○ | ○ |
| Adhesiveness | | | | | | | | | |
| PMMA | ○ | ○ | ○ | ○ | ○ | ○ | ○ | Δ | ○ |
| Nylon 12 | ○ | ○ | ○ | ○ | ○ | ○ | ○ | X | Δ |
| Thermoplastic polyurethane | ○ | ○ | ○ | ○ | ○ | ○ | ○ | Δ | Δ |
| Fluorine-containing quaternary copolymer | ○ | ○ | ○ | ○ | ○ | ○ | ○ | Δ | Δ |

Example 8

An SUS 316 autoclave having a net capacity of 500 ml, provided with a stirrer was degassified to vacuum, and then 330 g of perfluoro(2-n-butyl-tetrahydrofuran) was charged thereto. Then, the autoclave was degassified and flushed with a nitrogen gas, and the following components were charged, followed by heating to 50° C., whereby the inside pressure of the autoclave was elevated to 0.62 MPa·G.

| | |
|---|---|
| Tetrafluoroethylene [TFE] | 20 g (53 mol. %) |
| $CF_2$=$CFO(CF_2)_3CH_2OH$[FHBVE] | 50 g (47 mol. %) |

Then, a solution of isobutyryl peroxide in a mixture of ($CF_3CF_2CHCl/CClF_2CF_2CHClF$) was added thereto as an initiator by a metering pump to initiate polymerization. Polymerization reaction was carried out for 20 hours until the inside pressure reached to 0.30 MPa·G.

The resulting slurry was poured into n-hexane, followed by filtration and drying, whereby 210 g of fluorine-containing copolymer was obtained. The resulting fluorine-containing copolymer had a composition of TFE/FHBVE=38/62 wt. %, and was subjected to measurement or evaluation of number average molecular weight Mn, glass transition temperature, refractive index, solubility, light transmissivity, adhesiveness, and coatability.

Copolymer composition: according to the same procedure as disclosed in Example 1

Number average molecular weight Mn: by GPC measurement of a THF eluate, using Shodex GPC KD805+KD-803+KD-G Glass transition temperature Tg: Determined by an instrument Model DSC220C, made by Seiko Instrument Co.

Refractive index: according to the same procedure as disclosed in Example 1

Solubility: By visual evaluation of the state of a 5 wt. % solution in MEK or $C_6F_6$ after shaking for 24 hours. Those dissolved were assessed as being satisfactory "○", those partially dissolved as being fairly satisfactory "Δ", and those not dissolved as being unsatisfactory "X"

Light transmissivity: According to the same processure as disclosed in Example 1, where a transmissivity of more than 95% at wavelengths of 400-800 nm was as being satisfactory "○", that of 80-95% as being fairly satisfactory "Δ", and that of less than 80% as being unsatisfactory "X"

Adhesiveness: By applying a 5 wt. % solution in MEK or $C_6F_6$ onto a polycarbonate plate (thickness: 2 mm) by casting, removing the solvent by drying, cross-cutting the resulting film into 100 squares, 1 mm×1 mm each, by a cutter knife, subjecting the cross-cut squares to a peeling test using a cellophane adhesive tape ten times, and counting how many squares remained on the substrate, where more than 95 remaining squares were assessed as being satisfactory "○", 80-95 remaining squares as being fairly satisfactory "Δ", and less than 80 remaining squares as being unsatisfactory "X"

Coatability: Those, with a good coatability were assessed as being satisfactory "○", whereas those suffering from gelling of the solution and incapable of coating were assessed as being unsatisfactory "X"

Example 9

In Example 8, components to be charged after the degassing and flushing with a nitrogen gas were changed as follows:

| | |
|---|---|
| Tetrafluoroethylene [TFE] | 36 g (60 mol. %) |
| $CF_2$=$CFO(CF_2)_2OCF(CF_3)CH_2OH$[FHVEPA] | 82 g (40 mol. %), | and the polymerization temperature was changed to 45° C. The resulting fluorine-containing copolymer (220 g) had a composition of TFE/FHVEPA=35/65 wt. %.

Example 10

In Example 8, components to be charged after the degassing and flushing with a nitrogen gas were changed as follows:

| | |
|---|---|
| Tetrafluoroethylene [TFE] | 20 g (42 mol. %) |
| Vinylidene fluoride [VdF] | 5 g (16 mol. %) |
| $CF_2$=$CFO(CF_2)_2OCF(CF_3)CH_2OH$[FHVEPA] | 68 g (42 mol. %) |

The resulting fluorine-containing copolymer (230 g) had a composition of TFE/VdF/FHVEPA=31/6/63 wt. %.

Example 11

In Example 8, components to be charged after the degassing and flushing with a nitrogen gas were changed as follows:

| | |
|---|---|
| Tetrafluoroethylene [TFE] | 20 g (54 mol. %) |
| $CF_2$=$CFO(CF_2)_2OCF(CF_3)CH_2OH$[FHVEPA] | 58 g (46 mol. %), | and the reaction solvent was changed to 250 g of ethyl acetate. The resulting fluorine-containing copolymer (35 g) had a composition of TFE/FHVEPA=33/67 wt. %.

Comparative Example 3

In Example 8, components to be charged after the degassing and flushing with a nitrogen gas were changed as follows:

| | |
|---|---|
| Tetrafluoroethylene [TFE] | 24 g (60 mol. %) |
| Perfluoro(methyl vinyl ether) [FMVE] | 60 g (40 mol. %) |

The resulting fluorine-containing copolymer (40 g) had a composition of TFE/FMVE=53/47 wt. %.

Results of measurements and evaluation obtained in the foregoing Examples 8 to 11 and Comparative Example 3 are shown in the following Table 2.

TABLE 2

| Items of measurements · evaluation | Ex. 8 | Ex. 9 | Ex. 10 | Ex. 11 | Comp. Ex. 3 |
| --- | --- | --- | --- | --- | --- |
| Copolymer composition | | | | | |
| TFE (wt. %) | 38 | 35 | 31 | 33 | 53 |
| VdF (wt. %) | | | 6 | | |
| FHVEPA (wt. %) | | 65 | 63 | 67 | |
| FHBVE (wt. %) | 62 | | | | |
| FMVE (wt. %) | | | | | 47 |
| Number average molecular weight Mn | 86,000 | 85,000 | 85,000 | 15,000 | measurement impossible |
| Tg (° C.) | 39 | 42 | 22 | 40 | 0 |
| Refractive index ($nD^{25}$) | 1.340 | 1.337 | 1.360 | 1.338 | 1.340 |
| Solubility | | | | | |
| MEK | ○ | ○ | ○ | ○ | X |
| $C_6F_6$ | ○ | ○ | ○ | ○ | X |
| Light transmissivity | ○ | ○ | ○ | ○ | ○ |
| Adhesiveness | ○ | ○ | ○ | ○ | — |
| Coatability | ○ | ○ | ○ | ○ | — |

INDUSTRIAL UTILITY

The present high-molecular weight fluorine-containing copolymer has distinguished characteristics such as not only a good melt processability, but also a good adhesiveness to various substrates, without substantial deterioration of high light transmissivity and low refractive index in the visible light region, and thus can be effectively used as various molding materials for films, sheets, tubes, hoses, rods, blocks, belts, bottles, tanks, etc., or as laminating or composite-making materials together with various substrates, and the resulting molding products, laminates, and composites can be suitably used in the fields requiring chemical resistance, high light transmissivity, low light refraction, low dielectric property, etc. such as chemical liquid tubes, fuel hoses, antireflection films, etc. The present low-molecular weight copolymer can be used suitably for thin film formation, because thin films, which are difficult to form by melt molding, can be readily formed from a solution of the low-molecular weight fluorine-containing copolymer in an organic solvent.

The invention claimed is:

1. A fluorine-containing copolymer, which comprises -0.1-68% by weight of hydroxyl-terminated, fluorine-containing vinyl ether, represented by the following general formula:

$$CF_2=CF[OCF_2CF(CF_3)]_bO(CF_2)_aO[CF(CF_3)CF_2O]_c CF(CF_3)CH_2OH$$

where subscript a is an integer of 1-10, and the total of subscripts b+c is an integer of 0-8, and -99.9-32% by weight of at least one of other fluorine-containing unsaturated monomers.

2. A fluorine-containing copolymer according to claim 1, wherein the fluorine-containing vinyl ether is a hydroxyl-terminated fluorine-containing vinyl ether, represented by the general formula:

$$FC_2=CFO(CF_2)_aOCF(CF_3)CH_2OH$$

where subscript a is an integer of 1-10.

3. A fluorine-containing copolymer according to claim 1, wherein the fluorine-containing unsaturated monomers are compounds represented by the following general formula:

$$R_1R_2C=CR_3R_4$$

where $R_1$, $R_2$, $R_3$ and $R_4$ are same or different groups, which are individually hydrogen atoms, chlorine atoms, fluorine atoms, fluoroalkyl groups, fluoroalkyl ether groups, or fluoroalkoxyfluoroalkyl ether groups, having 1-24 carbon atoms, at least one of which is a fluorine atom, or a fluorine-containing group.

4. A fluorine-containing copolymer according to claim 1, wherein the hydroxyl-terminated fluorine-containing vinyl ether is copolymerized in a proportion of 0.1-20% by weight.

5. A fluorine-containing copolymer according to claim 1, which has a melt viscosity (230° C.) of 0.10-100 g/10 min.

6. A fluorine-containing copolymer according to claim 1, which has a melting point of 260° C. or lower.

7. A fluorine-containing copolymer according to claim 1, which has a light transmissivity at wavelengths of 250-650 nm of 70% or more.

8. A molding product, melt molded from a fluorine-containing copolymer according to claim 7.

9. A multilayered structure or composite, which comprises a fluorine-containing copolymer according to claim 7 and a substrate.

10. A fluorine-containing copolymer according to claim 3, wherein the monomers are copolymerized in a proportion of 10-85% by weight of tetrafluoroethylene, 3-50% by weight of perfluoro (lower-alkyl vinyl ether) and 7-85% by weight of vinylidene fluoride, on the basis of the resulting fluorine-containing copolymer.

* * * * *